(12) United States Patent
Feygin et al.

(10) Patent No.: US 7,731,500 B2
(45) Date of Patent: Jun. 8, 2010

(54) VASCULAR-ACCESS SIMULATION SYSTEM WITH THREE-DIMENSIONAL MODELING

(75) Inventors: David Feygin, Washington, DC (US); Gerald Higgins, Takoma Park, MD (US); Chih-Hao Ho, Reston, VA (US); Marjorie Moreau, Arlington, VA (US); Ned Way, Columbia, MD (US)

(73) Assignee: Laerdal Medical Corporation, Wappingers Falls, NY (US)

( * ) Notice: Subject to any disclaimer, the term of this patent is extended or adjusted under 35 U.S.C. 154(b) by 1024 days.

(21) Appl. No.: 10/887,348

(22) Filed: Jul. 8, 2004

(65) Prior Publication Data

US 2006/0008786 A1    Jan. 12, 2006

(51) Int. Cl.
*G09B 23/28* (2006.01)

(52) U.S. Cl. .................. 434/272; 434/262; 434/267

(58) Field of Classification Search ......... 434/262–275, 434/350; 604/115–116; 606/41; 607/96, 607/101, 122
See application file for complete search history.

(56) References Cited

U.S. PATENT DOCUMENTS

| | | | |
|---|---|---|---|
| 3,704,529 A | 12/1972 | Cioppa | |
| 3,722,108 A | 3/1973 | Chase | |
| 4,134,218 A | 1/1979 | Adams et al. | |
| 4,850,960 A | 7/1989 | Grayzel | |
| 5,472,345 A | 12/1995 | Eggert | |
| 5,616,031 A * | 4/1997 | Logg | 434/38 |
| 5,800,178 A * | 9/1998 | Gillio | 434/262 |
| 5,821,920 A | 10/1998 | Rosenberg et al. | |
| 5,853,292 A | 12/1998 | Eggert et al. | |
| 6,038,488 A | 3/2000 | Barnes et al. | |
| 6,088,020 A | 7/2000 | Mor | |
| 6,443,735 B1 | 9/2002 | Eggert et al. | |
| 6,470,302 B1 * | 10/2002 | Cunningham et al. | 703/7 |
| 6,527,558 B1 | 3/2003 | Eggert et al. | |
| 6,538,634 B1 | 3/2003 | Chui et al. | |
| 6,568,941 B1 | 5/2003 | Goldstein | |
| 6,652,487 B1 * | 11/2003 | Cook | 604/115 |
| 6,773,263 B2 | 8/2004 | Nicholls et al. | |
| 7,182,602 B2 | 2/2007 | Lakin et al. | |
| 2003/0031993 A1 | 2/2003 | Pugh | |
| 2003/0069719 A1 | 4/2003 | Cunningham et al. | |

(Continued)

FOREIGN PATENT DOCUMENTS

FR        2622721 A    5/1989

(Continued)

*Primary Examiner*—Xuan M Thai
*Assistant Examiner*—Timothy Musselman
(74) *Attorney, Agent, or Firm*—DeMont & Breyer, LLC

(57) ABSTRACT

The illustrative embodiment is a simulation system for practicing vascular-access procedures without using human subjects. The simulator comprises a data-processing system and a haptics device. The haptics device provides the physical interface at which an end effector, which is representative of a medical instrument (e.g., a needle, catheter, etc.), is manipulated with respect to a haptics-device base to simulate instrument insertion. The data-processing system, by exchanging signals with the haptics device, provides a three-dimensional simulation that includes the resistive forces that a medical practitioner would experience if the simulated procedure were an actual procedure that was being performed on a real anatomy (e.g., human arm, etc.). The simulator displays the ongoing simulation and assesses the performance of its user.

34 Claims, 5 Drawing Sheets

U.S. PATENT DOCUMENTS

| | | |
|---|---|---|
| 2003/0210259 A1 | 11/2003 | Liu et al. |
| 2004/0002045 A1 | 1/2004 | Wellman et al. |
| 2004/0009459 A1* | 1/2004 | Anderson et al. ........... 434/262 |
| 2004/0024418 A1 | 2/2004 | Irion et al. |
| 2004/0030303 A1 | 2/2004 | Prais et al. |
| 2004/0076940 A1 | 4/2004 | Alexander et al. |
| 2004/0097806 A1 | 5/2004 | Hunter et al. |
| 2005/0142525 A1* | 6/2005 | Cotin et al. ................. 434/262 |

FOREIGN PATENT DOCUMENTS

WO        03096307 A1    11/2003

* cited by examiner

100

VASCULAR-ACCESS SIMULATION SYSTEM WITH THREE-DIMENSIONAL MODELING

STATEMENT OF RELATED CASES

This case is related to U.S. patent applications Ser. No. 10/807,017, Ser. No. 10/807,047, Ser. No. 10/806,531, and Ser. No. 10/807,016, all of which are incorporated by reference herein.

FIELD OF THE INVENTION

The present invention relates generally to systems that simulate medical procedures for the purposes of training or accreditation. More particularly, the present invention relates to a system, apparatus and subsystems for simulating vascular-access procedures.

BACKGROUND OF THE INVENTION

Medical practitioners, such as military medics, civilian emergency-medical personnel, nurses, and physicians, routinely perform vascular-access procedures (e.g., intravenous insertion, central venous line placement and peripherally-inserted central catheter, etc). It is desirable for a practitioner to be proficient at performing these procedures since the proficient practitioner is less likely to injure a patient and is almost certain to reduce the patient's level of discomfort.

Becoming proficient in vascular-access procedures requires practice. In fact, the certification and re-certification requirements of some states mandate a minimal number of needle sticks, etc., per year per provider. Historically, medical practitioners practiced needle-based procedures on live volunteers. More recently, simulation techniques and devices have been developed to provide training in vascular-access procedures without the use of live volunteers.

Some vascular-access simulation systems that are in the prior art include an interface device and a data processing system. To practice a vascular-access procedure, a user manipulates an "instrument," which extends from the device and serves as a catheter-needle. Potentiometers and encoders within the interface device track the motion and position of the instrument and relay this information to the data processing system. The data processing system performs a simulation of the surface and subsurface anatomy of human skin, and determines the effect of the instrument's motion on the skin's anatomy. Simulated results are displayed by the data processing system. Using the motion information from the interface device, the data processing system also generates a control signal that controls a force-feedback system that is coupled to the instrument. The force-feedback system generates various resistive or reactive forces that are intended to simulate the forces that are experienced by a medical practitioner during an actual vascular-access procedure. The user senses these forces during manipulation of the instrument.

Although some systems in the prior art have the ability to simulate forces that the user feels during the manipulation of the instrument, those forces experienced by the user are often unrealistic. This is particularly the case as the instrument progresses along its intended path. There is an expectation that the forces experienced using the instrument should change in a realistic way as a function of (i) the insertion displacement and (ii) the point of insertion on the anatomy.

The inability of prior-art vascular-access simulation systems to realistically simulate a vascular-access procedure limits their usefulness as training or accreditation tools.

SUMMARY OF THE INVENTION

The illustrative embodiment of the present invention is a simulation system that provides realistic training and practice for performing vascular-access procedures without using human subjects. Unlike most prior-art simulation systems, some embodiments of the present system provide a realistic, three-dimensional simulation that includes the resistive forces that a medical practitioner would experience if the simulated procedure were an actual procedure that was being performed on a real anatomy (e.g., human arm, etc.). The resistive forces are derived from a force-feedback profile that is based on the interaction of two models: a medical instrument model and an anatomical model. Both models are three-dimensional and are able to represent characteristics that can vary according to factors such as (i) the insertion displacement and (ii) the point of insertion on the anatomy.

The illustrative embodiment of a vascular-access simulator includes a data-processing system and an interface device, the latter referred to herein as a "haptics device." The haptics device provides the physical interface for performing vascular-access procedures. More particularly, a user inserts an end effector, which is representative of a medical instrument (e.g., a needle, catheter, etc.) into the base of the haptics device and manipulates it to simulate needle insertion, cannulation, etc. In some embodiments, the simulator is capable of sensing the orientation of the end effector. For example, in some embodiments in which the end effector is a needle or catheter or both, the simulator is capable of sensing the orientation of a beveled end of the needle or catheter.

In accordance with the illustrative embodiment, the haptics-device base includes a receiver that receives the end effector when inserted into the haptics-device base. In some embodiments, the receiver provides one linear degree of freedom and two, independent, rotational degrees of freedom (i.e., pitch and yaw). In the illustrative embodiment, the linear degree of freedom enables a user to advance the end effector into the haptics-device base. This mimics the insertion of a needle or catheter into a patient's arm. The rotational degrees of freedom enable a user to move an engaged end effector up or down and left or right. This mimics the freedom of movement that a user has during an actual vascular-access procedure.

Sensors within the haptics-device base monitor the motion and position of the end effector (e.g., by measuring the insertion displacement and pitch and yaw angles of the receiver, etc.). The sensors generate signals indicative of the monitored activity and transmit the signals to the data processing system.

The data processing system processes the information acquired by the sensors. In conjunction with (i) a model of a medical instrument, such as a needle/catheter, and (ii) an anatomical model of at least a portion of an anatomy (e.g., human arm, etc.), the data processing system determines the effects (e.g., deformation, entry into a vein, etc.) of a user's manipulation of the needle/catheter on the surface and subsurface features of the body part on which the simulated vascular-access procedure is being performed. The effects of the modeling are displayed by the simulator. The effects include, for example, a three-dimensional rendering of the body part of interest, a visual indication of the position of the needle/catheter relative to the body part, and a visual indication of how the needle/catheter affects that body part.

Furthermore, in some embodiments, using the anatomical model and the information obtained from the sensors, the data processing system determines the various resistive forces that would arise if the user were manipulating a needle or catheter through an actual anatomy (e.g., human arm, etc.). The data processing system determines the resistive forces to simulate penetration or contact with various surface and subsurface features of human anatomy (e.g., the skin, a vein, harder structures such as ligaments, bones, etc.) The resistance advantageously varies with insertion displacement and the pitch and yaw of the end effector because the resistance is determined based on the interaction of the medical instrument model and the anatomical model.

The resistance that would be experienced by the user manipulating an actual needle/catheter through an actual anatomy is represented by a force-feedback profile. The force-feedback profile, in accordance with the illustrative embodiment of the present invention, is based on the interaction of the medical instrument model and the anatomical model. In some embodiments, the force-feedback model is based on the puncture strengths and stiffnesses of the various surface and subsurface features of the human anatomy, as represented by the anatomy model.

The data processing system provides control signals that are based on the force-feedback profile to the haptics device. The haptics device uses the control signals to generate the resistance experienced by the user of the simulation system.

In some embodiments, the data processing system also tracks the progress of the haptics device user during a simulated procedure. The steps taken by the user are compared against a set of rules that are stored in the data processing system. The assessment comprises critical points and non-critical points. The simulator displays the assessment results when the user completes the simulated procedure.

An illustrative embodiment of the present invention comprises: providing a three-dimensional model of at least a portion of an anatomy, wherein the three-dimensional model describes at least a portion of a blood vessel; providing a three-dimensional model of a medical instrument; and generating a force-feedback profile based on the interaction of the model of the anatomy and the model of the medical instrument.

DETAILED DESCRIPTION

Figure 1:
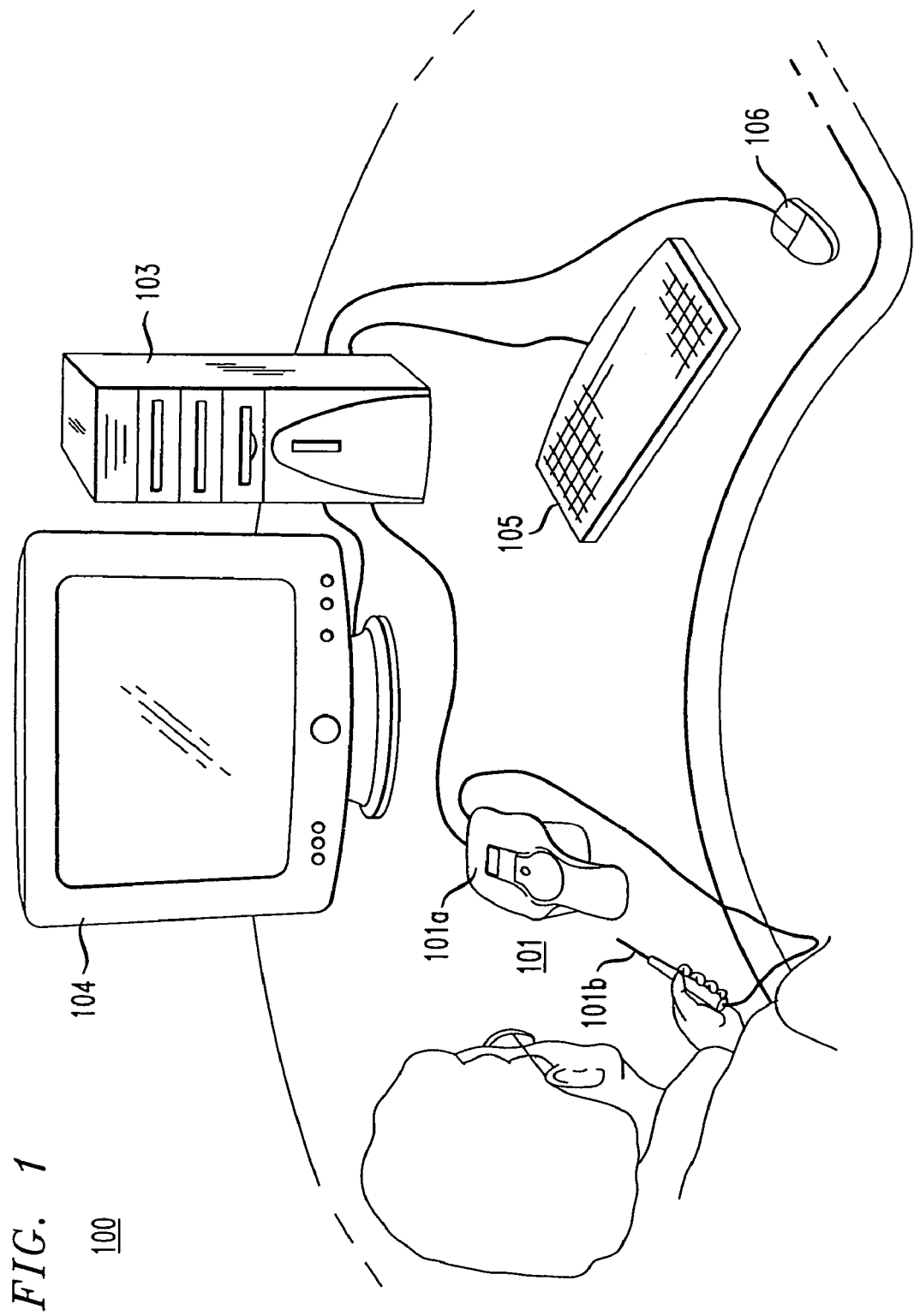
FIG. 1 depicts a schematic diagram of vascular-access simulator 100 in accordance with the illustrative embodiment of the present invention.

The illustrative embodiment of the present invention pertains to a simulation system that provides realistic training and practice for vascular-access procedures without using human subjects. As depicted in FIG. 1, vascular-access simulator 100 comprises haptics device 101, computer 103, monitor 104, keyboard 105, and computer mouse 106. Also depicted is a user of vascular-access simulator 100 holding a part of haptics device 101.

Haptics device 101 provides the physical interface for performing any of several simulated vascular-access procedures (e.g., intravenous catherization, central line placement, sternal intraosseous insertion, etc.). As depicted in FIG. 1, the physical interface provided by haptics device 101 is between one part (element 101-b) that simulates a medical instrument, such as a catheter or needle, and another part (element 101-a) that simulates at least a portion of an anatomy, such as a human forearm or other body part.

The term "haptics" relates to touch (i.e., the sense of touch). A fundamental function of haptics device 101, and indeed any haptics interface, is to create a means for "communication" between users (i.e., humans) and machines. This communication is possible since humans are capable of "mechanically" interfacing with their surroundings due, at least in part, to a sense of touch. This "sense of touch" includes sensations of pressure, texture, puncture, thermal properties, softness, wetness, friction-induced phenomena, adhesions, etc. Furthermore, humans also experience vibrotactile sensations, which include the perception of oscillating objects in contact with the skin and kinesthetic perceptions (i.e., awareness of one's body state, including position, velocity, and forces supplied by the muscles). The human ability to perceive a variety of these sensations is exploited by haptics device 101.

To the extent that some embodiments of vascular-access simulator 100 are intended for use as a practice and training tool, it is advantageous for haptics device 101 to simulate vascular-access procedures as realistically as possible and provide a quantitative measure of the user's performance of the simulated procedure. To this end, haptics device 101 possesses one or more of the following attributes, in addition to any others:

It possesses sufficient degrees-of-freedom to simulate the relatively free movement of a needle/catheter during an actual vascular-access procedure.

It offers the opportunity to perform all steps of a vascular-access procedure, including, for example, needle insertion, skin interactions (e.g., palpation, skin stretch, etc.), catheter threading, etc.

It generates appropriate skin- and venous-puncture forces.

It measures or otherwise quantifies the effects of user actions on simulated anatomy.

It generates appropriate haptic feedback (i.e., feel) during skin-interaction steps.

It is configured to provide ergonomically-correct hand position during simulated vascular-access procedures.

It is small enough so that it can be positioned in front of a computer monitor so that the haptics device and the monitor are inline with a user's forward-looking field of view.

It is at least subtly suggestive of a human anatomy and does not present any substantial departures from that anatomy so as to support a user's ability to "suspend disbelief" during a simulated vascular-access procedure.

Figure 2:
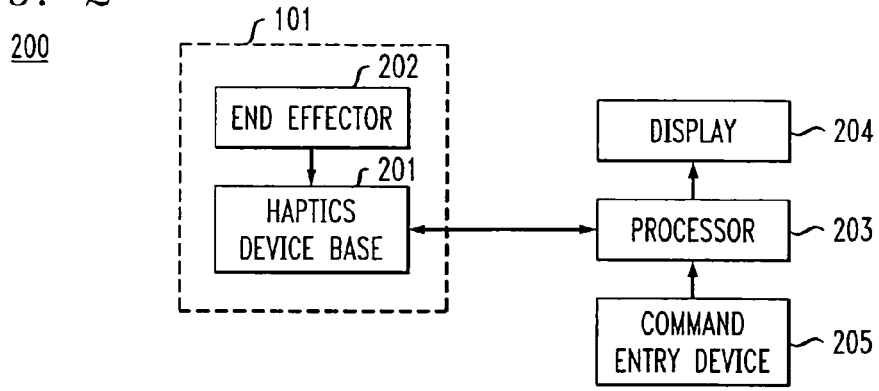
FIG. 2 depicts a block diagram of the salient components of simulator 200.

FIG. 2 depicts a block diagram of simulator 200, one embodiment of which is vascular-access simulator 100. Simulator 200 comprises haptics-device base 201, end effector 202, processor 203, display 204, and command entry device 205, interconnected as shown.

Haptics device 101 is depicted in FIG. 2 as comprising haptics-device base 201 and end effector 202.

For the purposes of this specification, the term "end effector" is defined as a device, tool or instrument for performing a task. An end effector is representative of a medical instrument. In some embodiments, end effector 202 is intended to be used to simulate a catheter, needle, or both as part of a vascular access procedure. In those embodiments, end effector 202 is configured to be very similar to the real catheter or needle.

Haptics-device base 201 comprises functional elements of haptics device 101 that relate to human anatomical features or are otherwise intended to generate resistive forces that would be sensed when penetrating such anatomical features. In an actual vascular-access procedure, the catheter or needle remains outside of the body until it's inserted during the procedure. Likewise, in accordance with the illustrative embodiment, end effector 202 remains outside of haptics-device base 201 until a portion of end effector 202 is inserted during a simulated vascular-access procedure. In some embodiments, haptics-device base 201 is subtly shaped like a portion of an anatomy that it is simulating, such as a human arm. Yet, haptics-device base 201 is nondescript enough to avoid creating a discontinuity between what is seen and what is felt.

End effector 202 is intended to be inserted into haptics-device base 201. In some embodiments, simulator 200 is capable of sensing orientation of the end effector, so as to determine the orientation of a feature of a catheter or needle. In some embodiments, the feature is a bevel. This is an important aspect of the real insertion technique, since proper bevel orientation reduces a patient's discomfort during needle/catheter insertion.

Once inserted into haptics-device base 201, the tip of end effector 202 engages a receiver. The receiver supports the continued "insertion" of end effector 202 into haptics-device base 201. In particular, in some embodiments, haptics-device base 201 is configured to provide one linear degree of freedom and two rotational degrees of freedom (i.e., pitch and yaw). The linear degree of freedom provides a variable insertion displacement, enabling a user to advance end effector 202 into the "patient's arm" (i.e., haptics-device base 201). The rotational degrees of freedom enable a user to move (an engaged) end effector 202 up or down and left or right. In some embodiments, haptics-device base 201 measures insertion displacement, and pitch (up/down) and yaw (left/right) angles.

In some embodiments, haptics-device base 201 provides "force feedback" to a user, whereby the user senses a variable resistance during continued advance (insertion) of end effector 202. The resistance is intended to simulate penetration of the skin, a vein, and harder structures such as ligaments, bones, and the like. The resistance advantageously varies with insertion displacement and the pitch and yaw of end effector 202, as described further below.

It will be understood that the "measurements" of angle, position, etc. that are obtained by the functional elements described above are obtained in conjunction with various sensors and processor 203. In particular, most of the functional elements described above include one or more sensors. The sensors obtain readings from an associated functional element, wherein the readings are indicative of the rotation, displacement, etc., of some portion of the functional element. These readings provide, therefore, information concerning the manipulation of end effector 202 in addition to any other parameters. Each sensor generates a signal that is indicative of the reading, and transmits a representation of the signal to processor 203.

As described later below, haptics-device base 201 also receives signals from processor 203 as part of a closed loop force-feedback system. These control signals vary the resistive force presented to the user of simulator 200 to account for various anatomical structures (e.g., vein, tissue, tendons, bone, etc.) that haptics device 101 encounters, based on the simulation. As a consequence, the resistance to continued needle/catheter insertion that is experienced by the user of simulator 200 is consistent with the resistance that would be sensed by a practitioner during an actual vascular access procedure.

For additional detail on haptics device 101, refer to the applicant's co-pending U.S. patent application Ser. No. 10/807047.

Processor 203 is a general-purpose processor, such as computer 103, that is programmed to perform the tasks described below and with respect to FIGS. 3 through 7. Processor 203 is capable of receiving and processing signals from haptics device 101, running software for the visual portion of the vascular-access simulation including an anatomy simulator, and sending control signals to haptics device 101 to support closed-loop force feedback. Processor 203 constitutes a part of the data-processing system of simulator 200. It will be clear to those skilled in the art, after reading this specification, how to make and use processor 203.

Display 204 displays a rendering of the appropriate anatomy (e.g., arm, etc.) of an anatomical model and displays and tracks the course of a medical instrument model within this anatomy. Display 204 receives the generated renderings from processor 203. An example of display 204 is monitor 104. It will be clear to those skilled in the art how to make and use display 204.

Command entry device 205 is used by the user of simulator 200 to enter commands that affect how processor 203 performs its tasks. In some embodiments, command entry device 205 is one or both of a keyboard and computer mouse (e.g., keyboard 105, computer mouse 106, etc.). It will be clear to those skilled in the art how to make and use command entry device 205.

Figure 3:
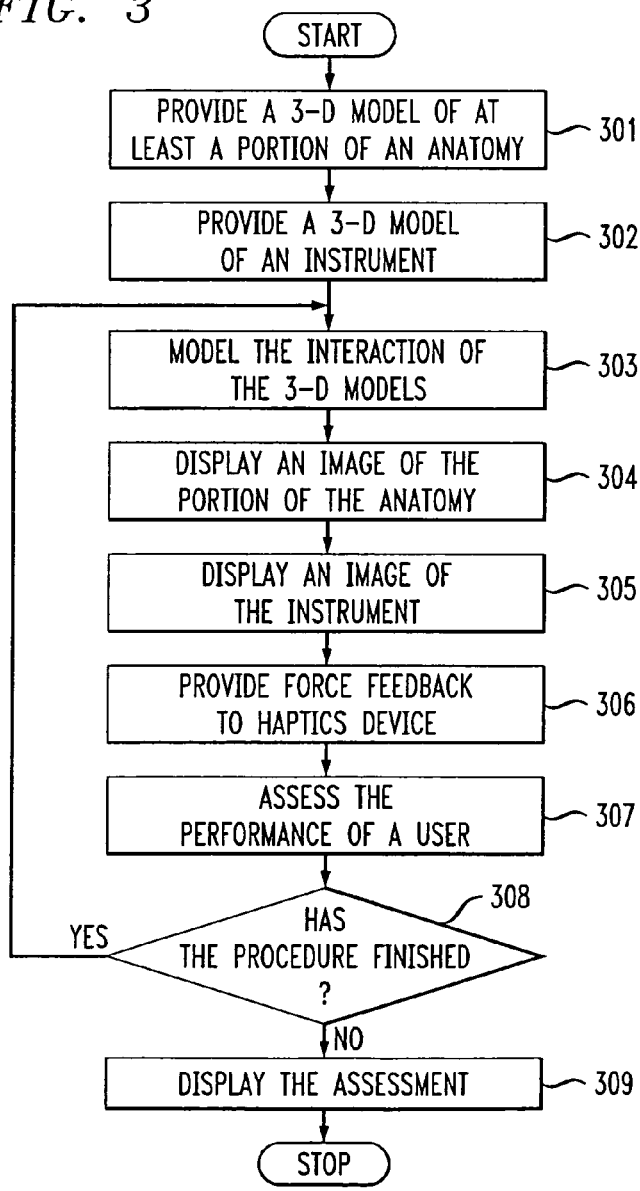
FIG. 3 depicts a flowchart of the salient tasks performed in accordance with the illustrative embodiment of the present invention.

FIG. 3 depicts a flowchart in accordance with the illustrative embodiment of the present invention.

Figure 4:
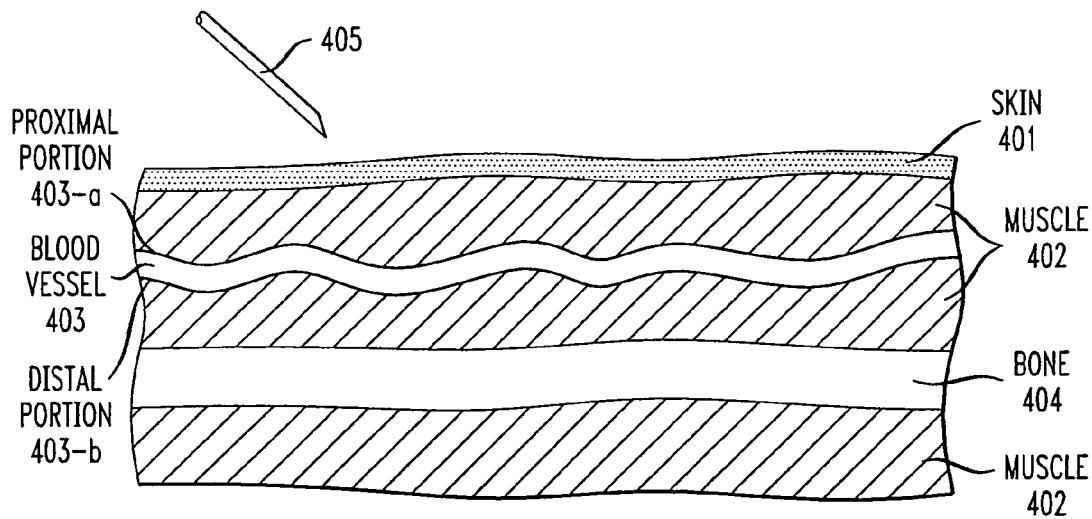
FIG. 4 depicts a partial side view of the anatomy of a human forearm.

At task 301, simulator 200 provides a three-dimensional, volumetric model of at least a portion of an anatomy. FIG. 4 depicts a partial side view of the anatomy of a human forearm. The human forearm comprises skin 401, muscle 402, blood vessel 403, and bone 404. Blood vessel 403, in turn, comprises proximal portion 403-a and distal portion 403-b, relative to the insertion point of a depicted medical instrument, needle/catheter 405.

The anatomical model defines the anatomical features of a relevant anatomy; for example, the bone, muscle, skin, the proximal and distal portions of blood vessels, etc., of a human forearm, as depicted in FIG. 4. In some embodiments, data obtained from a portion of a particular anatomy, such as real imaging data from a computer-aided tomography (CAT) scan, are used to provide a basis for the model. In other embodiments, generic data, such as subject matter from a medical textbook, are used to provide a basis for the model. It will be clear to those skilled in the art how to select suitable anatomical data for the purpose of creating an anatomical model.

Simulator 200 stores the anatomical model in a memory that is associated with processor 203. It will be clear to those skilled in the art, after reading this specification, how to store the representation of a model in memory.

In accordance with the illustrative embodiment of the present invention, simulator 200 models the anatomy using a vector graphical format. As is known in the art, the vector format describes shapes mathematically, instead of directly storing a representative collection of points that constitute the shape. In particular, the vector format defines each point or shape in three-dimensional Cartesian space by using lines, coordinates, and other attributes. For example, a cylinder can be represented by specifying three parameters:

i) first endpoint $(x_1, y_1, z_1)$;
ii) second endpoint $(x_2, y_2, z_2)$; and
iii) radius $r_1$;

wherein the first endpoint coincides with the center of one circular end of the cylinder, the second endpoint coincides with the center of the other circular end, and the radius describes the size of the circular ends.

Simulator 200 models complex shapes by combining the individual vector representations of "building block" shapes. For example, bone 404 can be modeled by piecing together individual cylinders with each cylinder segment custom-drawn to approximate bone 404. Also, each cylinder can be tapered by assigning a different radius at either end of the cylinder to model the tapering characteristic of the bone.

It will be clear to those skilled in the art how to represent points and shapes in Cartesian space by using vector format.

In some embodiments, simulator 200 models the anatomy using a raster graphical format, as is known in the art. The raster format defines each point or shape in three-dimensional Cartesian space by storing one or more points that are separated by a known, fixed distance (e.g., one millimeter, etc.). The distance between adjacent points determines the resolution of the image.

For example, a five-millimeter line in three-dimensional Cartesian space might be represented in raster format by storing six points: (1,1,0), (2,1,0), (3,1,0), (4,1,0), (5,1,0), and (6,1,0). Note that the distance between adjacent points is one millimeter. In contrast, a five-millimeter line might be represented in vector format by specifying two points, (1,1,0) and (6,1,0), and specifying that a line exists between the two points.

It will be clear to those skilled in the art how to represent points and shapes in Cartesian space by using raster format.

Furthermore, it will also be clear to those skilled in the art how to combine vector and raster formats. For example, it is possible to embed a raster-modeled shape in a vector-modeled shape for added flexibility in modeling.

Simulator 200, in accordance with the illustrative embodiment, models the stiffnesses and puncture strengths of skin 401, muscle 402, proximal portion of vessel 403-a, distal portion of vessel 403-b, and bone 404. Stiffness is based on the change in resistive force with respect to the change in displacement of needle/catheter 405. Puncture strength is based on the point at which the resistive force drops as the displacement of needle/catheter 405 increases. One such point, for example, is when needle/catheter 405 pierces skin 401. Both stiffness and puncture strength ultimately affect how quickly the displacement of needle/catheter 405 can change.

In accordance with the illustrative embodiment of the present invention, simulator 200 associates a stiffness and puncture strength with each shape stored. In other embodiments, simulator 200 associates a stiffness and puncture strength with a subset (e.g., the upper layers of the anatomical model, etc.) of the shapes stored. The associated values can be in units of force (e.g., newtons, etc.), or they can be normalized with respect to each other. It will be clear to those skilled in the art, after reading this specification, how to represent puncture strength and stiffness.

Simulator 200, in accordance with the illustrative embodiment of the present invention, initializes through a two-step process the parameters (e.g., stiffness, puncture strength, skin color, structure, etc.) of the anatomical model being used. In the first step, simulator 200 selects one of multiple, pre-configured anatomical models, where each pre-configured model is based on a specific combination of anatomical characteristics. Such characteristics include, but are not limited to, age, gender, ethnicity, obesity, and the position of the body part (e.g., pronated forearm, supinated forearm, etc.) involved in the procedure. For example, simulator 200 might select (e.g., through user input, etc.) a model of an obese man, as opposed to a thin man. Accordingly, simulator 200 selects a pre-configured model that exhibits characteristics representative of an obese man, such as a larger spacing between the blood vessels and skin compared with that of a thin man.

In the second step, simulator 200 adjusts the puncture strengths and stiffnesses of the components of the pre-configured, anatomical model selected. The adjustments are based on various anatomical characteristics that include, but are not limited to, state of health, blood-pressure level, and type of musculature. For example, the preconfigured, anatomical model of a woman of average build can be adjusted to represent an athlete. Accordingly, the puncture strength and stiffness of the anatomical components of the model are adjusted to reflect the presence of added muscle mass.

It will be clear to those skilled in the art, after reading this specification, how to make and use simulator 200 to use the preconfigured models only, the adjustable puncture strengths and stiffnesses only, or both modeling steps as in the illustrative embodiment.

At task 302, simulator 200 provides a three-dimensional model of a medical instrument. In the illustrative embodiment of the present invention, the medical instrument is a catheter, such as needle/catheter 405 depicted in FIG. 4. In other embodiments, the medical instrument is a needle. It will be clear to those skilled in the art, after reading this specification, how to incorporate other types of medical instruments into the modeling.

Simulator 200 stores the medical instrument model (hereinafter "instrument model") in a memory that is associated with processor 203. It will be clear to those skilled in the art, after reading this specification, how to store the representation of a model in memory.

Similar to how it models the anatomy, simulator 200 models the catheter using a vector format, in accordance with the illustrative embodiment. For example, needle/catheter 405 can be modeled as a combination of one or more long, tapered cylinders connected end-to-end with a beveled shape at the tip.

In other embodiments, needle/catheter 405 can be modeled using a raster format, in which the model is a collection of coordinate points.

Figure 5:
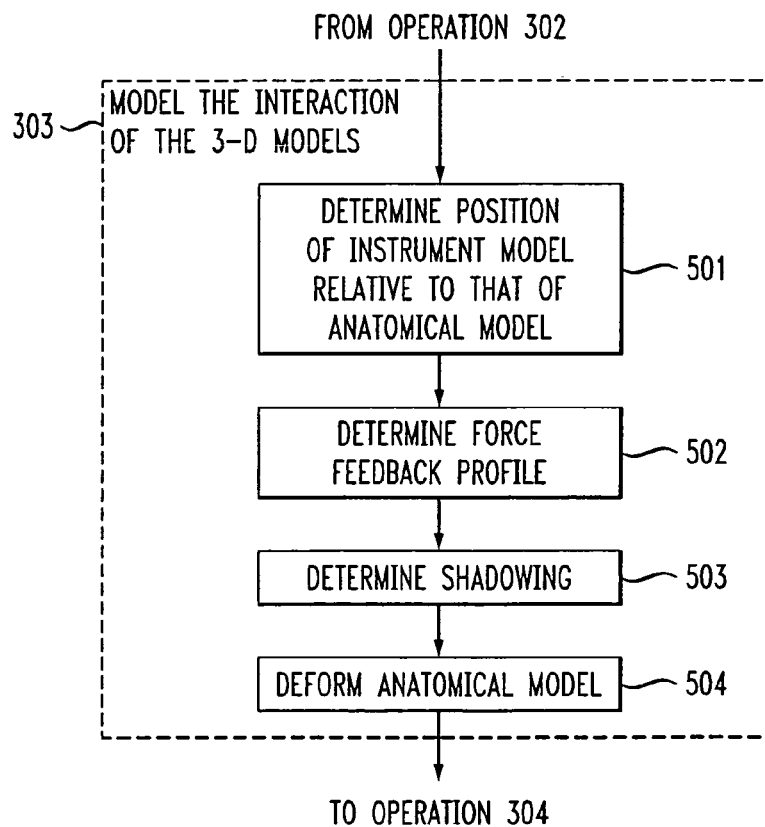
FIG. 5 depicts a flowchart of the salient operations performed at task 303.

At task 303, simulator 200 models the interaction of the anatomical model and the instrument model. FIG. 5 depicts a flowchart that shows the salient operations performed at task 303 in detail.

At task 501, processor 203 determines the position of the instrument model relative to the anatomical model. Processor 203 employs user inputs from command entry device 205 and sensor signals from haptics device 101 to determine the relative positions, as described below.

Processor 203 receives initialization commands from a user through command entry device 205, in accordance with the illustrative embodiment of the present invention. An example of an initialization command is the entry point of the instrument model with respect to the anatomical model. The entry point is adjacent to a modeled target vein. The target vein is the blood vessel that the user is attempting to penetrate.

The initialization commands are important, in that they provide a starting point for modeling the interaction between the anatomical model and the instrument model. Specifically, processor 203 determines how to align the instrument model's representation, up until now in its own Cartesian space, with the anatomical model's Cartesian space representation by using the entry point coordinate and angle of approach.

In other embodiments, the processor uses pre-determined values for entry point and angle of approach to determine where to join the instrument to the anatomy in the corresponding models.

When the user causes end effector 202 to come in contact with haptics-device base 201, haptics-device base 201 senses the contact and starts monitoring movement of end effector 202. As described earlier, haptics-device base 201 monitors movement of end effector 202 along axes that align with one or more available degrees of freedom.

Haptics-device base 201 generates signals that are indicative of the contact and monitored movement and transmits those signals to processor 203. It will be clear to those skilled in the art how to translate the sensor signals into magnitude and direction of movement.

As an example, suppose that skin 401 is represented in vector format as the space between two cylinders. Both cylinders share endpoints $(x_1,y_1,z_1)$ and $(x_2,y_2,z_2)$, the outer cylinder has a radius of $r_1$ and the inner cylinder has a radius of $r_2$, wherein $r_1 > r_2$. Furthermore, needle/catheter 405 is represented in vector format as a long, thin cylinder with a beveled shape at the tip. The user has selected an insertion point, which processor 203 translates in well-known fashion to be at coordinate $(x_3,y_3,z_3)$ on the outer cylinder. Then, signals from haptics-device base 201 indicate that insertion of end effector 202 has occurred. Consequently, processor 203 "moves" the tip of the instrument model to coincide with coordinate $(x_3,y_3,z_3)$ on the outer cylinder.

Continuing with the example, processor 203 then determines from the signals received from haptics-device base 201 that end effector 202 is continuing to pass through the insertion point. Processor 203 consequently updates the position of the instrument model relative to that of the anatomical model. The representative coordinates of the "cylinder" that represents end effector 202 are updated in memory to reflect the movement and orientation of end effector 202.

As end effector 202 continues to move, using the data contained in the signal(s) and the anatomical model described earlier, processor 203 determines the anatomical features that needle/catheter 405 would encounter (e.g., skin, vein, ligaments, bone, etc.), based on its position and orientation, were it moving through an actual anatomy.

Figure 6:
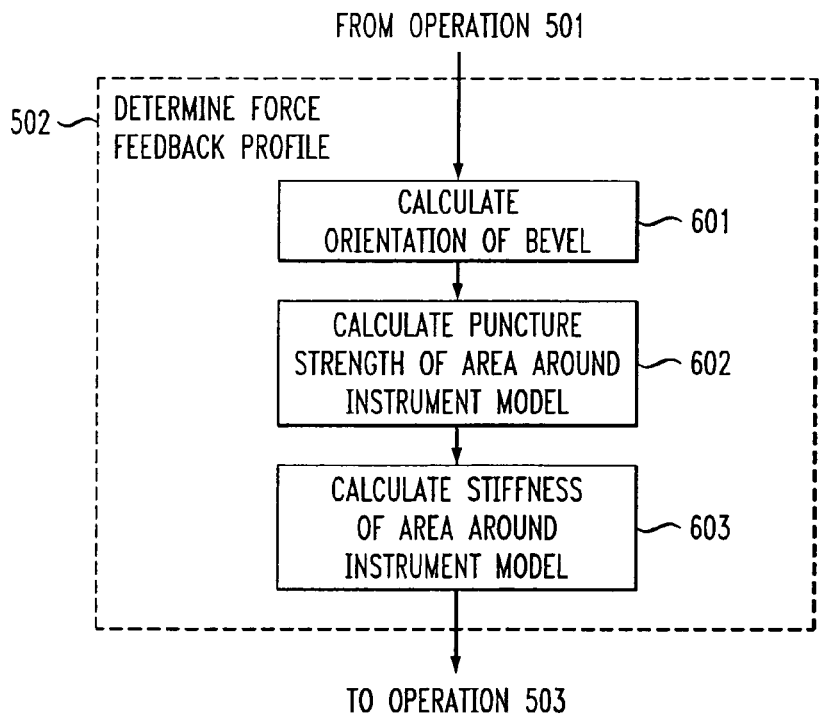
FIG. 6 depicts a flowchart of the salient operations performed at task 502.

At task 502, processor 203 determines the force feedback to apply to haptics device 101. The force feedback reflects the resistive forces that would arise as needle/catheter 405 encounters the various anatomical features present in the anatomy (e.g., human forearm, etc.). FIG. 6 depicts a flowchart that shows the salient operations performed at task 502 in detail.

At task 601, processor 203 calculates the orientation of the bevel of the instrument model. The orientation is determined by using the sensor signals received from haptics device 101. Processor 203 translates in well-known fashion the signals into position information. Bevel orientation (e.g., angular, axial, etc.) has an effect on resistive force. For example, needle/catheter 405 penetrating skin 401 with the needle bevel pointed up (i.e., needle point is penetrating first) typically encounters a less resistance than if it were penetrating with the bevel at another orientation.

At task 602, processor 203 calculates the puncture strength in the area around the instrument model. As described earlier, the puncture strength of each modeled component (e.g., skin, blood vessel, muscle, fat, etc.) is stored in memory. When the instrument model is proximate to a modeled component or components of the anatomy, processor 203 calculates how much resistive force is being encountered by using the puncture strength or strengths of one or more components. In some embodiments, processor 203 uses the stored puncture strength of the component that coincides with the calculated current position of a particular component of the instrument model (e.g., the tip, etc.). In other embodiments, processor 203 uses a weighted average of puncture strengths for components along the instrument model shaft.

Similarly, at task 603, processor 203 calculates the stiffness in the area around the instrument model. As described earlier, the stiffness of each modeled component (e.g., skin, blood vessel, muscle, fat, etc.) is stored in memory. When the instrument model is proximate to a modeled component or components of the anatomy, processor 203 calculates how much resistive force is being encountered by using the stiffness of one or more components. In some embodiments, processor 203 uses the stored stiffness of the component that coincides with the calculated current position of the instrument model tip. In other embodiments, processor 203 uses a weighted average of stiffness for components along the instrument model shaft.

Figure 7:
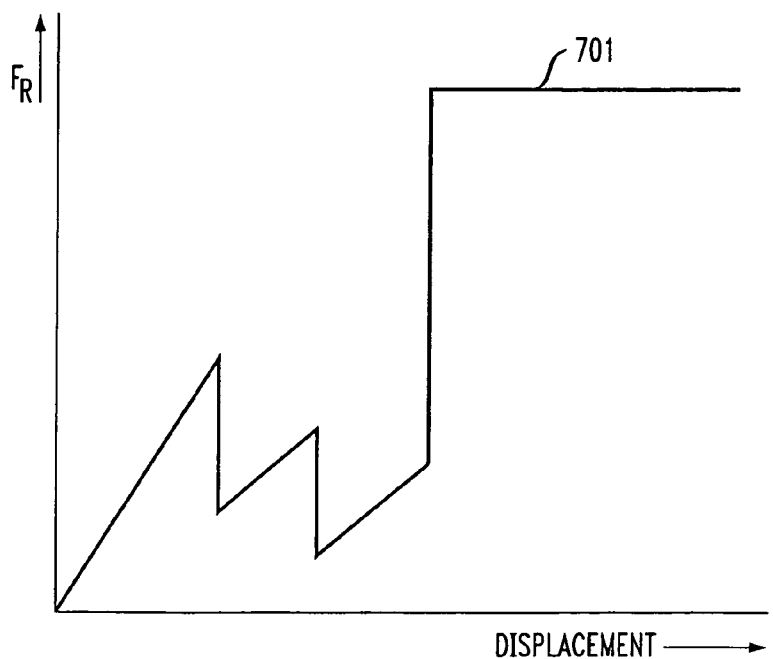
FIG. 7 depicts an example of a force feedback profile.

FIG. 7 depicts a graph that shows the overall resistive force $F_R$ as a function of displacement along the insertion point. Force-feedback profile 701 indicates that a user of end effector 202 (and of needle/catheter 405) should experience varying forces as end effector 202 advances into haptics-device base 201. The variations in force can be explained by the differences in numeric values for stiffness and puncture strength that are stored for each component (e.g., skin, fat, blood vessel wall, bone, etc.) of the anatomical model. For example, there are regions of needle/catheter displacement where the resistive force builds as function of displacement, due to the stiffness factor. Also, there are regions of displacement where the resistive force suddenly drops as a function of displacement, due to the puncture-strength factor. As described earlier, the resistive forces, represented by force-feedback profile 701, are affected by characteristics associated with the anatomy modeled because the stored numeric values for puncture strength, etc. are different from one modeled anatomy to another. For example, the force-feedback profile curve for a healthy, athletic, young woman can be different from that of an unhealthy, overweight, old man.

FIG. 7 serves as an example of a force-feedback profile. Different force-feedback profiles can occur based on the combination of the preconfigured model selected, the adjusted puncture strengths and stiffnesses, different paths that the instrument model takes through the anatomical model, and other factors. Furthermore, the force-feedback profile can be generated and updated dynamically as the instrument model interacts with the anatomical model.

Returning to FIG. 5, at task 503 processor 203 determines the shadowing of various components of both the instrument model and the anatomical model. Shadowing is a result of one or more components of the catheter and anatomy models at least partially blocking, at a particular area, the illumination from a simulated light source. Processor 203 models two types of shadowing: vein shadowing and catheter shadowing.

Processor 203 models vein shadowing by calculating a few factors. First, the anatomical model, described earlier, models the surface of skin 401 as a surface with texture. For example, the anatomical model comprises ridges that are representative of blood vessels near the surface of skin 401.

Second, processor 203 calculates, for a simulated light source, the shadowing effect of the illumination from that source as it impinges on the raised blood vessels. Processor 203 uses predetermined coordinates for the simulated light source, along with the position and orientation of the raised blood vessels with respect to the surrounding skin area in the model. It will be clear to those skilled in the art how to determine which areas of the anatomical model are exposed to the simulated light source and which areas are not, namely, the shadow areas. Processor 203 assigns a distinguishing indication (e.g., darker coloration, etc.) to the shadowed areas in the model.

Third, processor 203 calculates the force that the instrument model has on the anatomical model. Some of this force is along the surface of the skin and has the effect of "rolling" the vein—and, therefore, the shadow—to one side if the vein is not stabilized. Processor 203 updates the position stored in memory of the particular vein affected in the model and, with it, the position of the associated shadow.

Stretching the skin prior to needle/catheter insertion has the effect of making the skin taut, thereby stabilizing the vein. This prevents or minimizes vein rolling. On the other hand, if the skin is not stretched prior to needle/catheter insertion, the vein will not be stabilized. This results in the vein rolling. Haptics-device base 201 senses the action of skin-stretching by the user. The signals that correspond to the sensed action are made available to processor 203. Processor 203 uses the skin-stretch signals to determine whether or not to model a vein rolling and, with it, the changing of the shadow's position.

Processor 203 also calculates, for a simulated light source, the shadowing effect of the source interacting with the instrument model. The relative spatial position of the instrument model to the anatomical model is known. The position in Cartesian space of the simulated light source is also known. It will be clear to those skilled in the art how to determine which areas of the anatomical model are exposed to the simulated light source and which areas are blocked by the instrument model, thereby creating shadows on the surface of the anatomical model. Processor 203 assigns a distinguishing indication (e.g., darker coloration, etc.) to the shadowed areas in the model.

At task 504, processor 203 models how the anatomical model is deformed, both by the presence of the instrument model and by the events related to catheter insertion. Processor 203 models various anatomical deformations and changes, in accordance with the illustrative embodiment of the present invention.

The first anatomical deformation modeled is vein engorgement. Prior to contact of end effector 202 with haptics-device base 201, processor 203 models the veins in the area of interest becoming filled with additional blood, as would be the case when a constricting band (i.e., "C-Band") is applied. The modeling of the veins becoming filled is done in the illustrative embodiment by increasing the size of the shapes (e.g., the radii of the cylinders, etc.) that model the blood vessels in the affected area to reflect the enlarged, engorged veins. Processor 203, in some embodiments, increases the shadowing effect related to surface veins. Vein engorgement begins, in some embodiments, when the user of simulator 200 signals, via command entry device 205, an instruction that indicates the application of the constricting band. Later on, another instruction indicates the subsequent removal of the constricting band.

The second anatomical deformation modeled is skin indentation. When processor 203 receives signals from haptics device 101 that indicate contact of end effector 202 with haptics-device base 201, processor 203 models a depression of the portion of the anatomical model that is proximate to the instrument model. In vector format, for example, processor 203 can represent the depression using a conical shape, specifying that the shape represents empty space (i.e., the absence of modeled tissue). Processor 203 determines the location of the tip of the modeled catheter and uses the puncture strength of the modeled skin surface around the location. The depression increases until the modeled catheter "pops" through the surface of the modeled anatomy.

The third anatomical deformation modeled is swelling. If processor 203 determines that the instrument model has not intersected a vein in the anatomical model (i.e., the catheter has missed the vein), processor 203 simulates liquid from the needle/catheter entering the affected area. Processor 203 "grows" the area near the catheter tip by superimposing a shape on the anatomical model, in accordance with the illustrative embodiment. For instance, a spherical shape can be simulated in vector format by drawing a sphere with radius $r_4$ at center point $(x_4, y_4, z_4)$, the position of the catheter tip. The radius $r_4$ can be selected so that the sphere protrudes outside of the skin surface above the catheter tip.

Processor 203, in other embodiments, uses a "canned" stored image of a swollen forearm for display purposes after processor 203 determines that the instrument model has missed the vein in the anatomical model.

Another anatomical change that is modeled is bruising. If processor 203 determines that blood is being forced out through the puncture in a vein in the anatomical model, processor 203 simulates blood entering the affected area. Processor 203 "bruises" the area by changing the coloring around the puncture area. The amount of bruising is related to the degree of puncture (e.g., vessel punctured on proximal and distal sides, vessel punctured on proximal side only, etc.). The amount or size of bruising is also related to the characteristics of the anatomy modeled (e.g., age, medication being taken, etc.).

In other embodiments, processor 203 superimposes a shape (e.g., a "blotch," etc.) of randomized dimensions in the affected area.

Returning to FIG. 3, at task 304, simulator 200 displays an image of the anatomy modeled (e.g., human forearm, etc.) on display 204. Processor 203 sends image signals that represent the anatomical model to display 204 in well-known fashion.

In some embodiments, the user of simulator 200 can pan, zoom, or rotate the image displayed by display 204 by using command entry device 205 in well-known fashion.

At task 305, simulator 200 displays an image of needle/catheter 405 on display 204. Processor 203 sends image signals that represent the instrument model to display 204 in well-known fashion.

Figure 8:
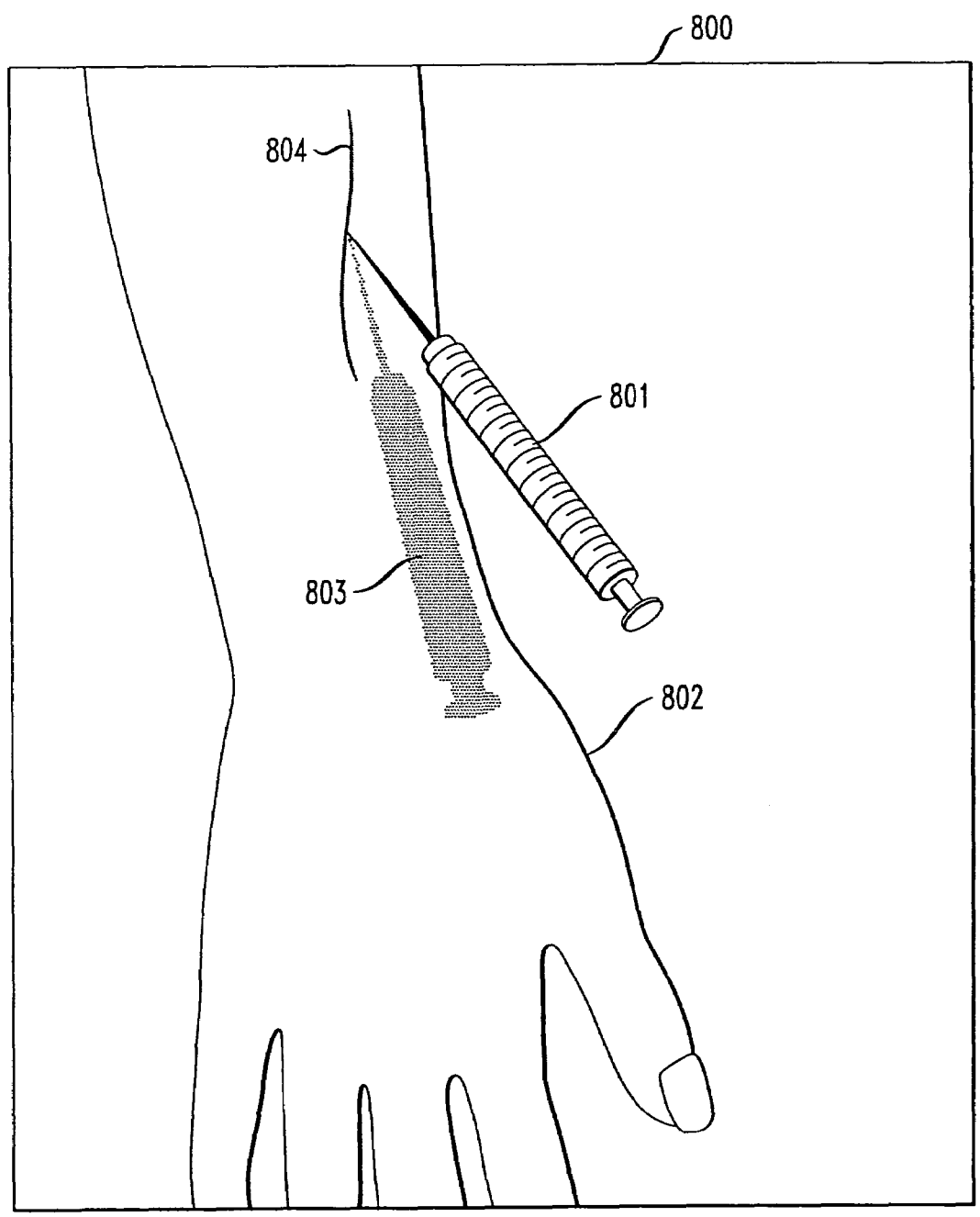
FIG. 8 depicts an example of a display image of the medical instrument model and anatomical model.

FIG. 8 depicts in display image 800 a combination of instrument model image 801 and anatomical model image 802. The portion of the anatomy modeled is a human forearm. Shadow image 803 is a result of the modeled interaction of the instrument model's position, the anatomical model's position, and a simulated light source. Shadow image 803 is indicative of the relative spatial position of the medical instrument model to the anatomical model.

Simulator 200, in accordance with the illustrative embodiment of the present invention, displays anatomical image 802 so that one or more features (e.g., veins, etc.) that are beneath the surface of the anatomy modeled are visible. For example, the subsurface blood vessel that the user is trying to penetrate is represented in display image 800 by target vein image 804.

Simulator 200, in accordance with the illustrative embodiment of the present invention, projects the subsurface blood vessel onto the skin surface and represents the surface image (i.e., target vein image 804) with coloration (e.g., bluish tone, etc.) that is different from the skin tone. First, simulator 200 determines the position of the shape to be projected relative to the display viewing angle. Second, simulator 200 determines, based on the first part, the area of visible skin surface to which the shape projects. Third, simulator 200 applies color to the determined area based on the color of the underlying shape.

The distinction between (i) projecting the blood vessel, in accordance with the illustrative embodiment, and (ii) assigning the modeled skin a certain alpha value, as is known in the art, is important. Assigning an alpha value results in unwanted features being visible to the user, such as bones. In contrast, projecting specific, underlying features, in accordance with the illustrative embodiment, results in only those features being visible to the user.

It will be clear to those skilled in the art how to take a subsurface shape, such as one associated with target vein image 804, and project it to an overlying, visible surface.

Simulator 200, in accordance with the illustrative embodiment of the present invention, orients and displays anatomical image 802 so that the target vein, which is represented by target vein image 804, is aligned top to bottom with respect to overall display image 800 at or around the entry point of the needle/catheter. This is not necessarily the same as aligning anatomical model image 802 with respect to display image 800. The latter would, for example, result in the overall image of a forearm to appear to extend from top to bottom. Aligning the target vein with respect to display image 800 is important because haptics-device base 201 is intended to emphasize the area of needle/catheter insertion over the overall anatomy modeled.

It will be clear to those skilled in the art how to take a shape, such as one that is represented by target vein image 804, and align it with respect to a frame of reference, such as display image 800. It will also be clear to those skilled in the art how to preserve the relative orientation of anatomical image 802 with respect to the target vein during the alignment.

At task 306, simulator 200 provides force feedback to haptics-device base 201, based on the force-feedback profile determined at task 502. Processor 203 takes the force-feedback profile determined and translates the profile into control signals. It will be clear to those skilled in the art how to translate data, such as the force-feedback profile, into signals. Processor 203 generates the control signals and transmits them to haptics-device base 201. These control signals vary the resistive force presented to the user by haptics-device base 201 to account for various anatomical structures (e.g., vein, tissue, tendons, bone, etc.) that needle/catheter 405 would encounter, based on the simulation. As a consequence, the resistance to continued needle/catheter insertion that is experienced by a user of simulator 200 is consistent with the resistance that would be sensed by a practitioner during an actual vascular access procedure.

At task 307, simulator 200, in accordance with the illustrative embodiment of the present invention, assesses the performance of the user of haptics device 101. Simulator 200 tracks the performance of the user while the user is performing the intended procedure on haptics device 101. Instead of stopping the user every time the user makes an error, simulator 200 allows the user to perform the entire procedure before simulator 200 provides the assessment to the user.

To assess the performance, simulator 200 uses expert-system rules that are pre-stored in processor 203 for the purpose of comparing. The rules reflect knowledge of correct medical procedures that are related to needle insertion or catheterization. The rules also reflect combinations of events. For example, (i) it is correct for a user to apply a constricting band and (ii) it is correct for the user to perform needle insertion in a certain way, but the user also has to (iii) apply the constricting band before the needle insertion. As the user of haptics device 101 progresses through the selected procedure, processor 203 compares what was actually performed by the user against the rules that reflect the correct procedure. It will be clear to those skilled in the art how to create and use rules, and to compare actual events against those rules.

Simulator 200 divides the assessment into critical points and non-critical points. Critical points are items that are essential to the performance of the procedure. Examples of critical points are:

i) Performing body substance isolation (BSI), an example being the wearing of gloves during catheterization;
ii) Using the constricting band;
iii) Using the catheter; and
iv) Preparing the target site (i.e., the entry point).

Improper performance of a critical point results in a critical point error.

Non-critical points are items that, although not essential to the performance of the procedure, reflect the quality of the performance. Examples of non-critical points are:

i) Inserting the needle/catheter using an optimal bevel position;
ii) Inserting the needle/catheter at the correct angle;
iii) Seating the catheter once it is inserted into the target site; and
iv) Controlling the vein (i.e., stretching the skin).

Improper performance of a non-critical point results in a non-critical point error.

Processor 203 stores the results of the procedure until retrieved by the user. In addition to the step-by-step performance, processor 203 also tracks and stores the amount of time it took to complete the procedure, the amount of time a constricting band was on the arm (if applied), and whether or not the user was successful in completing the procedure.

At task 308, simulator determines whether or not the simulated procedure has finished. Simulator 200 continually updates and displays the interaction of the catheter and anatomical models and provides force feedback, for at least as long as the procedure is in progress. In some embodiments, the procedure is in progress as long as end effector 202 is coupled to haptics-device base 201. In other embodiments, the procedure is in progress up to the point when the user enters a command to end the procedure. It will be clear to those skilled in the art, after reading this specification, how to determine whether the procedure is in progress or has finished.

At task 309, display 204 displays assessment of the performance of the user. The displayed assessment comprises the critical and non-critical errors detected by simulator 200 that were made by the user. It will be clear to those skilled in the art how to display a set of results from an assessment. For at least some of the errors detected, display 204 can display a corresponding educational vignette. A movie icon, in some embodiments, appears next to the errors that have educational vignettes.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   providing a model of an anatomy, wherein said model of said anatomy is a three-dimensional computer model and describes at least a portion of a blood vessel and at least a portion of a skin;
   providing a model of a medical instrument, wherein said model of said medical instrument is a three-dimensional computer model;
   providing a set of rules that reflect a correct performance of a medical procedure that comprises a predetermined critical task and a predetermined non-critical task;
   receiving user input, wherein, at least in part, the input pertains to a stretching of said skin;
   providing a force-feedback profile that is based on said model of said anatomy and said model of said medical instrument;
   modifying said model of said anatomy based on a vein rolling, wherein the extent of said vein rolling is based on said input pertaining to said stretching of said skin;
   simulating an interaction between said model of said anatomy and said model of said medical instrument, based on said user input, said force feedback, said model of said medical instrument, and said model of said anatomy; and
   assessing the quality of said user input by comparing said set of rules against said interaction.

2. The method of claim 1 wherein said medical instrument comprises a bevel and wherein said model of said medical instrument describes the angular orientation of said bevel.

3. The method of claim 2 wherein said medical instrument comprises a catheter.

4. The method of claim 2 wherein said force-feedback profile is based on the angular orientation of said bevel.

5. The method of claim 1 wherein said model of said anatomy further describes bone, muscle, skin, and the proximal and distal portions of said blood vessel.

6. The method of claim 5 wherein said model of said anatomy describes the puncture strength of said bone, said muscle, said skin, and the proximal and distal portions of said blood vessel.

7. The method of claim 6 wherein said force-feedback profile is based on the puncture strength of said bone, said muscle, said skin, and the proximal and distal portions of said blood vessel.

8. The method of claim 1 further comprising deforming said model of said anatomy based on vein engorgement.

9. The method of claim 1 further comprising deforming said model of said anatomy based on swelling.

10. The method of claim 1 further comprising modifying said model of said anatomy based on bruising.

11. The method of claim 1 wherein said model of said anatomy is raster-based.

12. The method of claim 1 wherein said model of said anatomy is vector-based.

13. The method of claim 1 further comprising:
   displaying an image of said anatomy, wherein said image of said anatomy is based on said model of said anatomy; and
   displaying an image of said medical instrument, wherein said image of said medical instrument is based on said model of said medical instrument.

14. A method comprising:
   (a) providing a model of an anatomy, wherein:
      (i) said model of said anatomy is a three-dimensional computer model; and
      (ii) said model of said anatomy describes bone, muscle, skin, and the proximal and distal portions of at least a portion of a blood vessel;
   (b) providing a model of a medical instrument, wherein said model of said medical instrument is a three-dimensional computer model and said model of said anatomy is modified based on a vein rolling, wherein the extent of said vein rolling is based on an input pertaining to stretching of said skin; and
   (c) displaying:
      (i) an image of a skin surface of said anatomy, wherein said image of said skin surface is based on said model of said anatomy, and wherein said portion of said blood vessel is projected onto said image of said skin surface, thereby forming an image of a target vein; and
      (ii) an image of said medical instrument, wherein said image of said medical instrument is based on said model of said medical instrument;
   wherein the combination of said image of said skin surface and said image of said medical instrument is based on the interaction of said model of said anatomy and said model of said medical instrument.

15. The method of claim 14 further comprising generating a force-feedback profile based on the interaction of said model of said anatomy and said model of said medical instrument.

16. The method of claim 14 further comprising orienting said image of said skin surface with respect to a display, wherein the orienting of said image of said skin surface is based on the aligning of said target vein with respect to said display.

17. The method of claim 14 further comprising displaying an image of a shadow of said medical instrument on said image of said skin surface, wherein said image of said shadow is indicative of the relative spatial position of said model of said medical instrument to said model of said anatomy.

18. A method comprising:
providing a model of an anatomy, wherein said model is a three-dimensional computer model and describes at least a portion of a blood vessel, and at least a portion of a skin;
providing a model of a medical instrument, wherein said model is a three-dimensional computer model;
modifying said model of said anatomy based on a vein rolling, wherein the extent of said vein rolling is based on an input pertaining to a stretching of said skin; and
assessing the performance of a user of a procedure that involves said medical instrument, by comparing i) the interaction, during said procedure, of said model of said anatomy and said model of said medical instrument, against ii) rules that reflect a correct performance of said procedure.

19. The method of claim 18 wherein said medical instrument is a catheter.

20. The method of claim 18 wherein said model of said anatomy further describes bone, muscle, skin, and the proximal and distal portions of said blood vessel.

21. The method of claim 18 further comprising generating a force-feedback profile based on the interaction of said model of said anatomy and said model of said medical instrument, wherein the generating of said force-feedback profile occurs before the displaying of said assessment of the performance of said user.

22. An apparatus comprising:
a force-feedback device;
an end effector, which is representative of a medical instrument; and
a processor for:
(i) modifying a model of an anatomy based on a vein rolling, wherein the extent of said vein rolling is based on an input by a user, said input pertaining to a stretching of a skin;
(ii) modifying a model of an anatomy in response to an interaction of said end effector and said force-feedback device;
(iii) generating a force-feedback profile that is based on said model of said anatomy;
wherein said model of said anatomy is a three-dimensional computer model and describes at least a portion of a blood vessel and at least a portion of a skin.

23. The apparatus of claim 22 wherein said medical instrument is a catheter.

24. The apparatus of claim 22 wherein said end effector comprises a bevel and wherein said force-feedback profile is based on the angular orientation of said bevel.

25. The apparatus of claim 22 wherein said model of said anatomy further describes bone, muscle, skin, and the proximal and distal portions of said blood vessel.

26. The apparatus of claim 25 wherein said model of said anatomy describes the puncture strength of said bone, said muscle, said skin, and the proximal and distal portions of said blood vessel.

27. The apparatus of claim 26 wherein said force-feedback profile is based on the puncture strength of said bone, said muscle, said skin, and the proximal and distal portions of said blood vessel.

28. The apparatus of claim 22 wherein the modifying of said model of said anatomy is based on vein engorgement.

29. The apparatus of claim 22 wherein the modifying of said model of said anatomy is based on swelling.

30. The apparatus of claim 22 wherein the modifying of said model of said anatomy is based on bruising.

31. The apparatus of claim 22 further comprising a display for:
(i) displaying an image of said anatomy, wherein said image of said anatomy is based on said model of said anatomy; and
(ii) displaying an image of said medical instrument, wherein said image of said medical instrument is based on said model of said medical instrument.

32. The apparatus of claim 31 wherein the displaying of said image of said anatomy with respect to said display is based on the aligning of a target vein with respect to said display.

33. The apparatus of claim 31 wherein said display is configured to display an image of a shadow of said medical instrument on said image of said anatomy, wherein said image of said shadow is indicative of the relative spatial position of said model of said medical instrument to said model of said anatomy.

34. The apparatus of claim 31 wherein said display is configured to display an assessment, wherein said assessment is based on assessing the performance of a user of said apparatus.

* * * * *